United States Patent [19]
Betron et al.

[11] 4,449,811
[45] May 22, 1984

[54] PLATEN COVER

[75] Inventors: Frank A. Betron, Plano; James W. Davis, Richardson; Barry C. Kockler, Lewisville; Lonnie K. Spears, Murphy, all of Tex.

[73] Assignee: The Mead Corporation, Dayton, Ohio

[21] Appl. No.: 355,975

[22] Filed: Mar. 8, 1982

[51] Int. Cl.³ .............................................. G03G 15/00
[52] U.S. Cl. .............................. 355/3 SH; 248/441.1; 355/75; 271/251
[58] Field of Search ................ 355/75, 76, 3 R, 3 SH; 271/251; 248/446, 441 R, D 12

[56] References Cited

U.S. PATENT DOCUMENTS

| 2,190,416 | 2/1940 | Davidson | 271/251 |
| 3,642,376 | 2/1972 | Halvorsen et al. | 355/75 |
| 3,717,411 | 2/1973 | Niesen et al. | 355/76 |
| 3,815,990 | 6/1974 | Newcomb et al. | 355/3 SH |
| 3,997,265 | 12/1976 | Menon et al. | 355/75 |
| 4,043,665 | 8/1977 | Caldwell | 355/76 |
| 4,097,145 | 6/1978 | Luperti et al. | 355/75 |
| 4,110,030 | 8/1978 | Knechtel | 355/11 |
| 4,135,805 | 1/1979 | Taylor et al. | 355/3 R |
| 4,158,497 | 6/1979 | Suzuki et al. | 355/8 |
| 4,368,973 | 1/1983 | Silverberg | 355/3 SH |

Primary Examiner—J. V. Truhe
Assistant Examiner—David Warren
Attorney, Agent, or Firm—Biebel, French & Nauman

[57] ABSTRACT

Disclosed is a platen cover for a copying machine in which the bound volume copying platen is not used for sheet document copying. The cover includes a sheet document transport and handling mechanism with the cover having an independently liftable lid to provide access to the transport and handling mechanism. Substantially uniform counter-balancing of the cover, containing the transport and handling mechanism, or the lid alone, from the closed hold-down position to the raised stay-open position, is provided by a torsional helix spring positioned about the pivotal axis of the lid counterbalancing the lid, and a gas spring acting on the transport and handling mechanism through a lever arm about the same axis, counterbalancing the mechanism.

9 Claims, 8 Drawing Figures

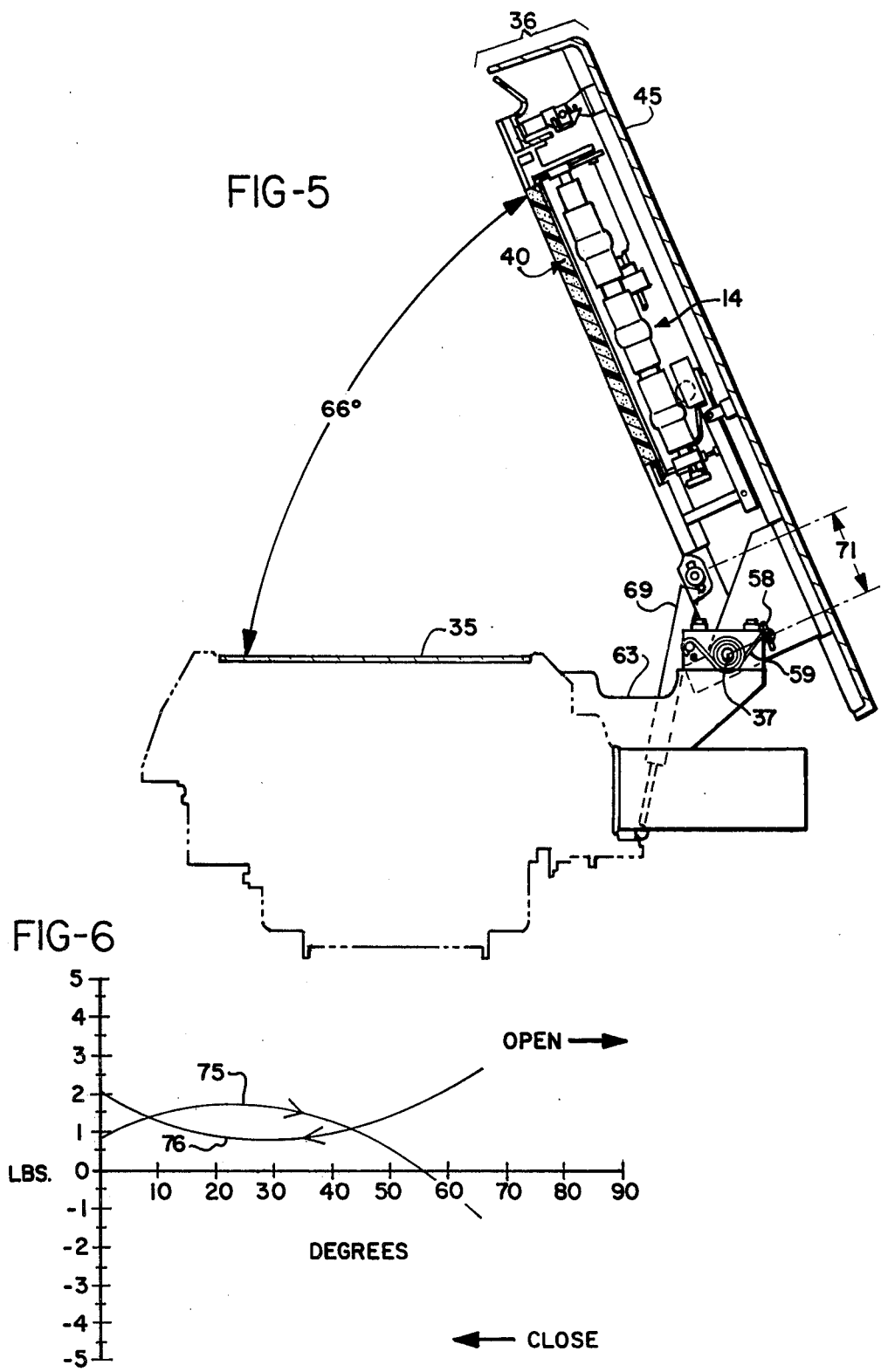

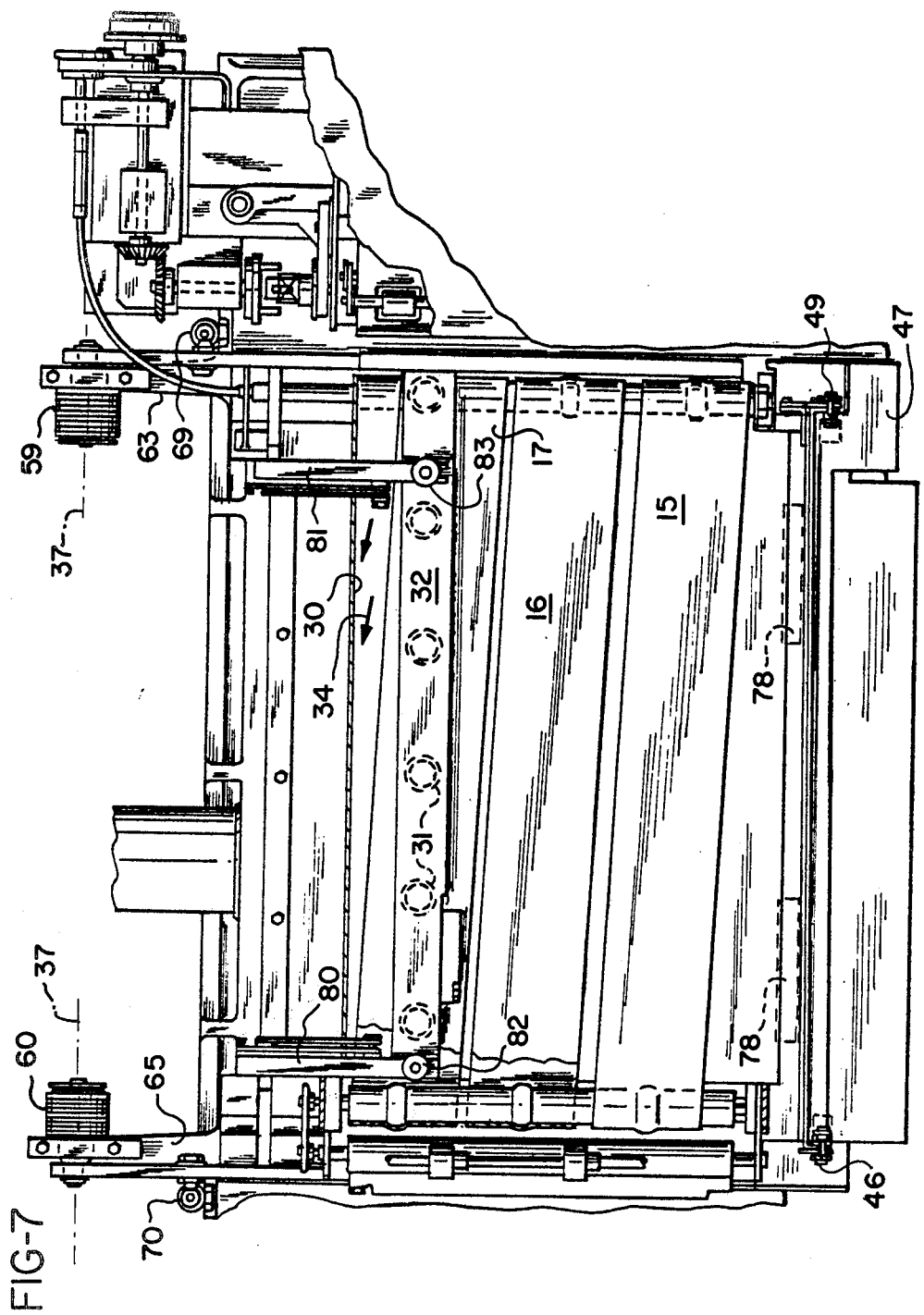

PLATEN COVER

BACKGROUND OF THE INVENTION

The invention relates to a cover and counterbalancing mechanism, and more particularly to a platen cover for a copying machine containing a sheet transport and alignment mechanism and having a compound counterbalancing system.

Typical prior art is exemplified by Taylor et al U.S. Pat. No. 4,135,805 which teaches the utility of a gas spring and a tension spring acting in opposition to counterbalance a platen cover that raises past the vertical. The tension spring is arranged to increasingly counter the force exerted by the gas spring as the cover is moved from the closed to the open position. This compensates for the reduced force exerted by the platen cover as it is opened. In the open position, the cover has moved past the vertical, and the tension spring is effective to counter the force exerted by the cover between vertical and the open position. All material copied is exposed through the platen. A transport mechanism in the cover moves the material across the platen.

Caldwell U.S. Pat. No. 4,043,665 teaches the utility of a spring assist counterbalance for a platen cover which contains a transport mechanism. The transport mechanism moves the material being copied across the exposure platen. The counterbalance spring provides operator assistance in the manual lifting of the cover unit up away from the platen into a raised or upright position and for retaining the entire unit in that upright position.

Menon et al U.S. Pat. No. 3,997,265 teaches the use of a coil spring cooperating with a counterbalance weight. The weight neutralizes the weight of the cover and the spring urges the cover to the open position so that the machine operator may readily raise the cover.

Halvorsen et al U.S. Pat. No. 3,642,376 teaches the use of torsional springs to urge the platen cover apparatus in an upward position until engaging a stop at approximately 70° to the horizontal. When the platen cover apparatus is to be closed on a document or book positioned on the platen glass, a downward force must be exerted against the action of the spring members until a latch member engages a locking member on the machine frame, releasably actuatable by a solenoid.

Knechtel U.S. Pat. No. 4,110,030 teaches machine structure for copying both sides of single sheet documents and for the copying of pages of bound volumes. A separate platen is used for exposing the bound volumes, and a traveling scanning system is used. Single sheets are scanned as they are moved past an exposure window located on the axis of a drum. The sheets traverse a diameter of the drum during exposure. The drum is then rotated through 180 degrees and the sheet motion reversed to copy the second side of the sheet.

Suzuki et al U.S. Pat. No. 4,158,497 teaches copying machine structure having a large platen and a moving optical system for copying bound volume material. The bound volume original remains stationary and is illuminated by a slit illuminating device which is reciprocated. For copying single sheets, the original is moved and a slit illuminating device remains stationary. Provision is made for making different size copies from the size of the original by varying the optical path lengths and the rates of movement.

SUMMARY OF THE INVENTION

The invention comprises cover apparatus for the bound volume and large material copying platen of a scanning system of a copying machine, wherein the book copying platen is not used in sheet document copying. The cover, in addition to being counterbalanced and liftable to provide access to the platen, provides the functions of: optically isolating the platen; providing a hold down force on material being copied; providing an enclosure for a sheet document transport and handling mechanism for moving and aligning single sheets from a document input holder to a sheet document scan station; providing a separately liftable counterbalanced lid over the mechanism for providing access to the mechanism; and providing means that, upon raising the lid, provides access to the interior of the sheet document transport. The counterbalancing of the lid functions either separately when only the lid is lifted, or in cooperation with the counterbalancing system of the mechanism when the complete cover is lifted to provide substantially equal hold down and hold open forces to the lid and to the complete cover.

Accordingly, it is an object of the invention to provide a liftable, counterbalanced bound volume platen cover that contains a sheet document transport and handling mechanism that aligns and moves single sheets from a document input station to a separate scan station.

It is a further object of the invention to provide apparatus as above with a counterbalanced, independently liftable lid and a cover for providing access to the mechanism.

It is a further object of the invention to provide apparatus as above wherein the lid counterbalancing apparatus cooperates with the transport and handling mechanism counterbalancing apparatus when the cover is raised to provide a substantially uniform lifting characteristic whether the lid only is raised or the complete cover including the lid is raised.

It is a further object of the invention to provide apparatus as above wherein the hold down and the hold open forces are substantially the same magnitude and substantially equal for the lid and the cover and with the hold open position being substantially less than vertical.

It is a further object of the invention to provide a lid and a cover for providing access to the transport and handling mechanism that, when the lid is lifted, the sheet hold down mechanism is raised from the transport belt.

These and other objects will become more apparent from the following description and drawings.

BRIEF DESCRIPTION OF THE DRAWINGS

FIG. 5 is a schematic-pictorial view showing a cover in the raised position;

FIG. 6 is a graphical plot illustrating typical lifting forces for the cover with counterbalancing provided by both torsion springs and gas springs;

FIG. 7 is a pictorial plan view illustrating skewed transport belts with caged hold down balls held by swing away lifting arms.

DESCRIPTION OF THE PREFERRED EMBODIMENT

Figure 1:
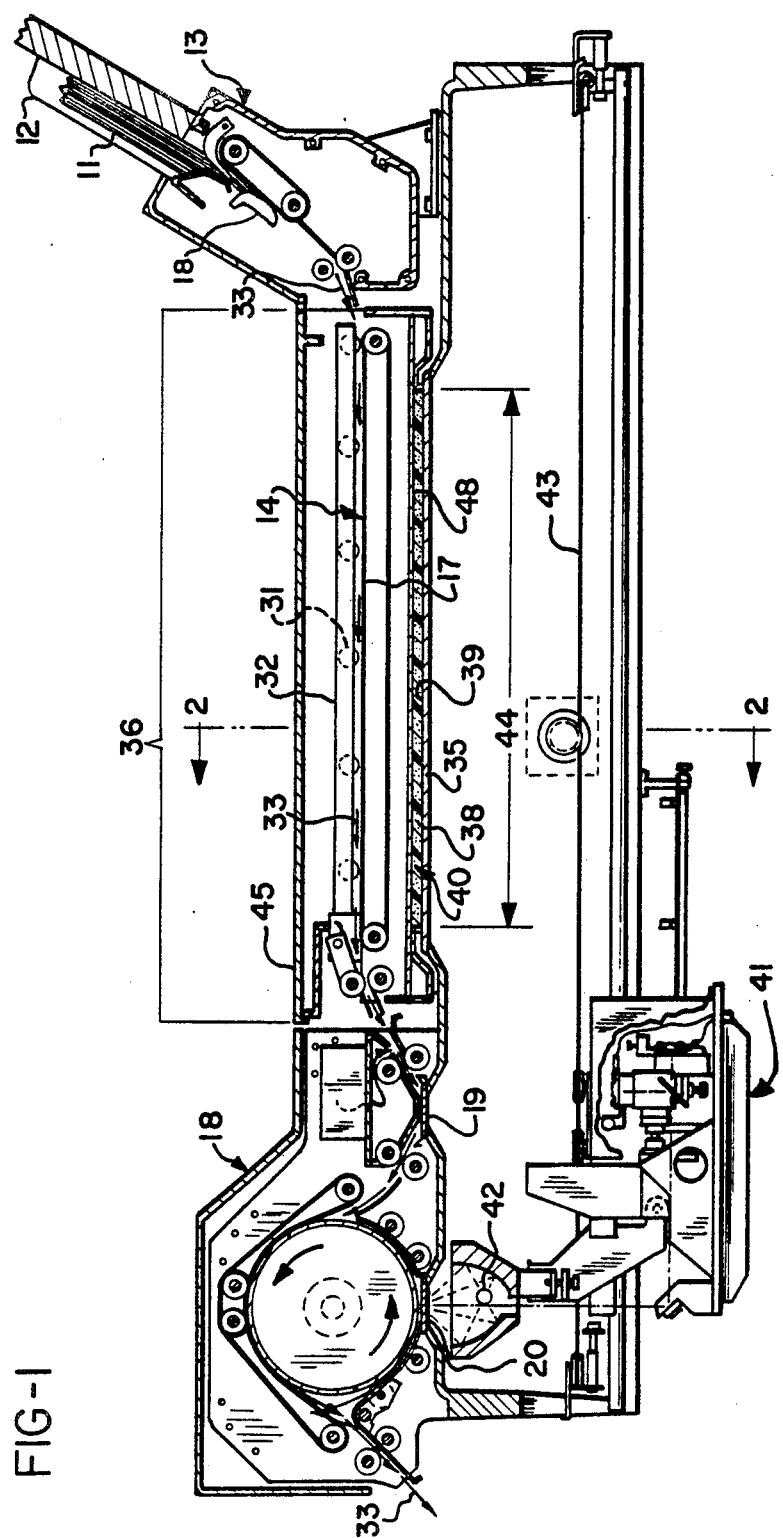
FIG. 1 is a side elevation and partial cross section view of a typical scanning system containing the invention.
Figure 2:
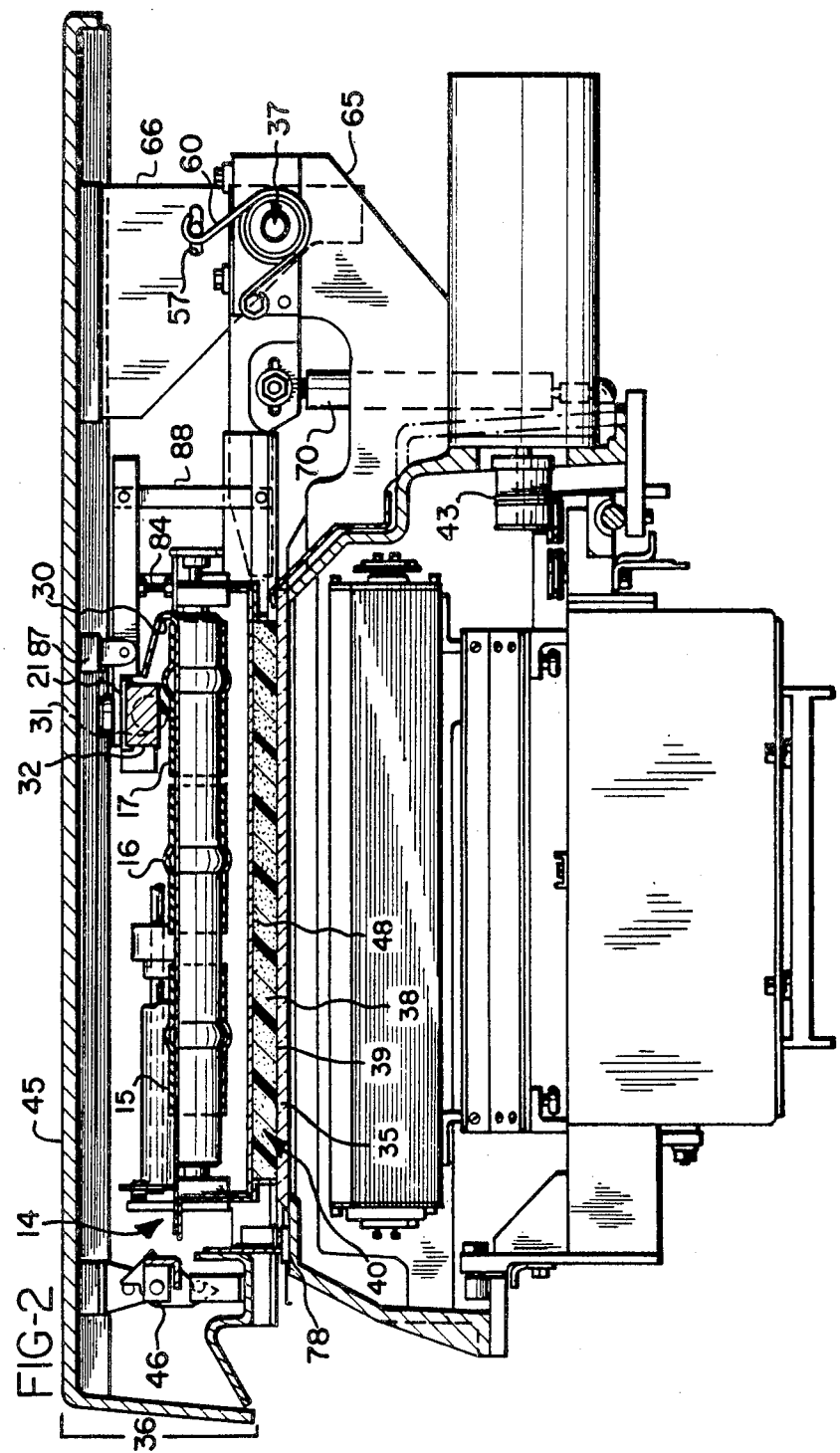
FIG. 2 is an elevation and partial cross section view taken along section 2—2 of FIG. 1.

To better understand the novel platen cover herein disclosed, a brief summary of a typical scanning system with which the invention cooperates will be given. This type of scanning system has separate exposure means for bound volumes and other large materials from the exposure means for the single sheet documents. Large bulky documents such as books, etc. are exposed by being manually placed on a large platen. Single sheet documents may be singly fed or stacked in an original document input rack from which they are automatically fed past a scan glass for copying. A typical embodiment of such a scanning system is illustrated in FIGS. 1 and 2. Single sheets 11 are placed in the original document input tray 12 from which the document feeder assembly 13 feeds the sheets, one at a time, to the transport and handling mechanism 14.

The transport and handling mechanism 14 has skewed elastic belts 15, 16, and 17 (see FIGS. 1, 2, and 7) for moving the sheets from the feeder assembly 13 to the scan station assembly 18 where one side of the sheet is exposed at a first scan glass 19 and the other side at a second scan glass 20. While the sheets are being transported by mechanism 14, they are moved by the skewed belts to index along document registration edge 30. It is desirable to have a length of travel for the sheets between a feeder mechanism and an exposure glass so that they may be properly aligned for movement past the exposure area. Caged hold down balls 31 (six, in the embodiment illustrated) are held by cage 32 and press the sheets against the skewed belt 17 to provide positive paper drive. The traveling arrows 33 in FIG. 1 illustrate the sheet paper flow through the handler. Arrows 34 in FIG. 7 illustrate the movement of the sheets toward the document registration edge 30.

Bound volumes and other large items not suitable for single sheet feeding are copied by manually placing them on large glass platen 35, (FIGS. 1, 2, and 5) after lifting platen cover 36 by manually rotating it about pivot axis 37. Cover 36 has a pressure pad 40 of soft foam 38 with a white film surface 39, conventionally attached such as by adhesive bonding to lower surface 48 to position and apply pressure to the material being copied. Preferably, white polyurethane elastomer sheet bonded to a resilient polyurethane foam is used for a suitable pressure pad in the form of a screening means that will provide a clean, smooth background around the copied material. The structure comprising the cover bottom 48 is attached to, and moves with, the transport handling mechanism 14. The scanner carriage assembly 41 has exposure lamp 42 and optical sensors (not detailed). It is moved by carriage drive cable 43 to positions along the platen scan area 44 for copying pages of bound volumes or other materials.

Since jams are almost inevitable with any paper handling equipment, it is highly desirable to have access to the mechanism so as to be able to readily service and remove any possible jams from the transport and handling mechanism. This access to mechanism 14 is provided by providing in the cover 36 a separately liftable lid 45 also pivotable about pivot axis 37. The lid is separately lifted by first manually tripping lid latch assemblies 46 and 49 by pressing on lever 47 (FIG. 7).

Figure 8:
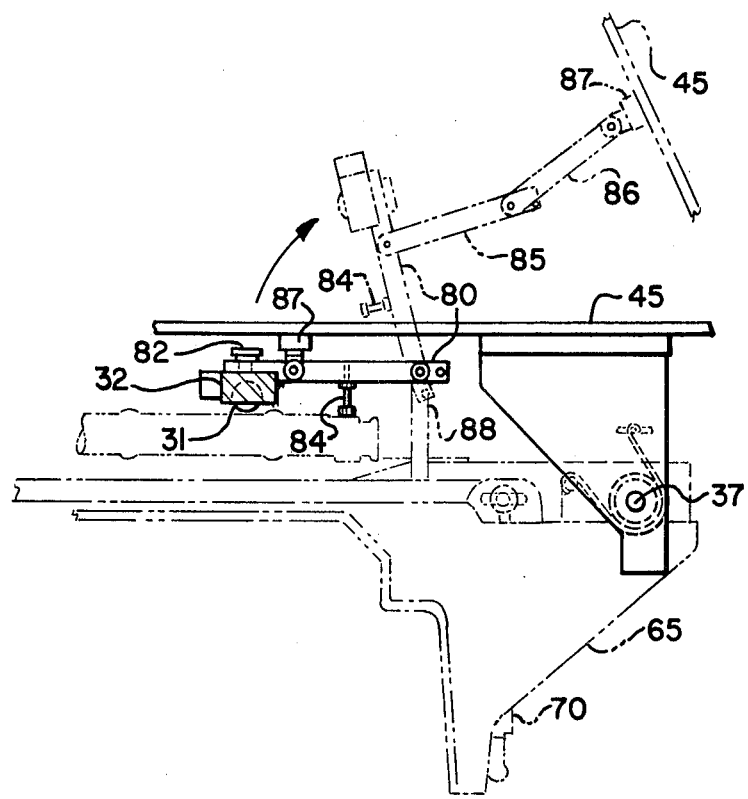
FIG. 8 is a pictorial-schematic view illustrating the lifting of the hold down balls upon the raising of the lid.

When lifting lid 45 to clear paper jams from the transport mechanism 14, it is desirable to raise the hold down balls 31 from the transport belt 17, as jams frequently take place between these two elements. For this purpose, the ball-cage is adjustably attached to a pair of lift arms 80 and 81 by threaded hand knobs 82 and 83. Vertical positioning of the ball-cage 32 is controlled by adjustable arm stops 84, and a similar stop on arm 81 (not illustrated). The ball-cage lift linkages comprise arms 85 and 86 pivotally attached to each other and to the ball-cage lift arm 80 and through pivot block 87 to the lid 45 and similar linkages for arm 81. When the lid 45 is closed, linkage members 85 and 86 fold together alongside lift arm 80. Lift arm 81 is connected to lid 45 in like manner as lift arm 80. The lift arms are pivoted to posts, such as post 88 for arm 80, attached to the frame of the transport mechanism. When the lid 45 is lifted, the hold down balls are raised from the transport belt as illustrated in phantom in FIG. 8.

The lid 45 comprising the top of the platen cover must be made quite strong so it will support without damage books, paper stacks, and other objects placed on it not only by persons using the machine but by others as well. Thus, the lid, to be sufficiently strong and large enough to protect the machine, is reasonably heavy. Typical weights of lids frequently range from 7 to 10 pounds. In order to reduce the operator effort in raising the lid, it is counterbalanced by torsional springs 59 and 60. It is to be noted that the torsional springs 59 and 60 are positioned about pivotal axis 37 and act between frame members 63 and 65 to which one end of each, respectively, is conventionally anchored and the lid support brackets 64 and 66 to which the other ends of the springs are conventionally anchored to pins in slots 57 and 58.

Figure 3:
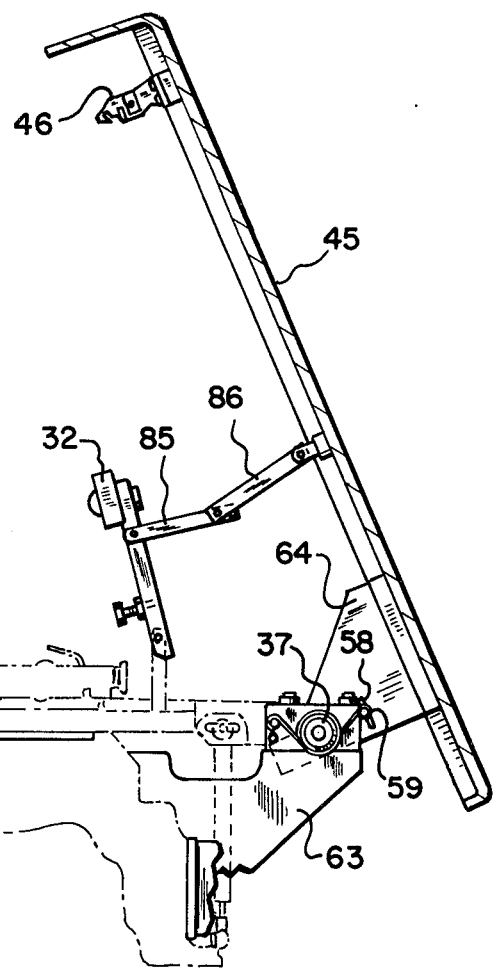
FIG. 3 is a schematic-pictorial view showing the cover lid in the raised position.

It is desirable that the lid be relatively easy to lift and, when raised, that it will stay open and yet not offer excessive resistance to closure. In some prior art platen covers, the hold open feature is accomplished by providing for the cover to go past the vertical so that the action of gravity on the cover holds it open. This frequently requires additional space to the rear of the machine and is unnecessary for normal usage. It has been found that an opening angle of about 66° is generally optimal. Thus, both the rotational movement of the lid and the complete cover are mechanically stopped at approximately 66° as illustrated in FIGS. 3 and 5. Either mechanical interference with lid members coming to rest against a frame member or conventional mechanical stops such as illustrated may be used.

Figure 4:
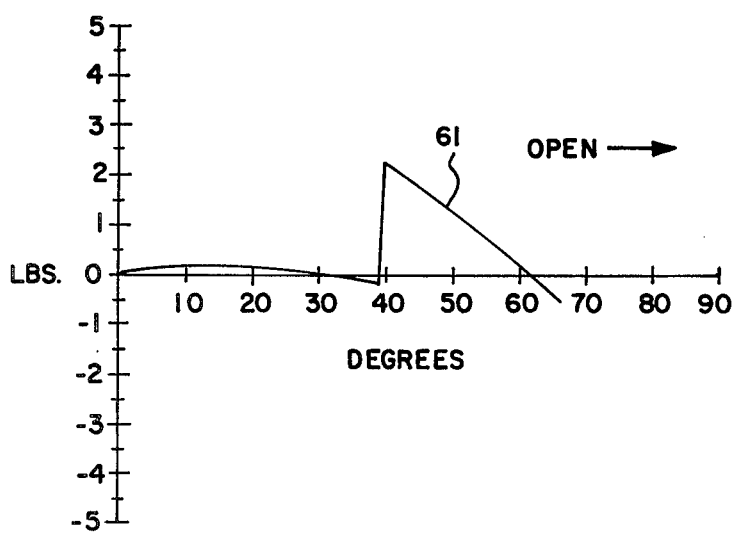
FIG. 4 is a graphical plot illustrating typical lifting forces for a lid with torsion spring counterbalancing.

The lifting forces required to raise the lid 45 counterbalanced by torsional springs 59 and 60, where each is preferably a 23 in.-lbs./rad. spring, are illustrated in curve 61 of FIG. 4. Torsion springs 59 and 60 effectively accomplish a neutral counterbalance from the closed position of lid 45 until it is open to approximately 39°. The slight negative force shown between 30° and 39° indicates that a slight restraining force is needed to prevent lid 45 from moving to the 39° position. Opening of lid 45 beyond 39° begins lifting of ball rack 32 by linkage members 85 and 86 (FIG. 3). This additional load accounts for the increase in lifting force shown in FIG. 4 between 39° and 40°. Beyond 40°, the lifting force required diminishes as ball rack 32 is lifted and moved horizontally toward pivot axis 37. At 62°, the lifting force again becomes negative, indicating that the lid 45 must be restrained to prevent further upward movement. The lid 45 is mechanically stopped at the 66° position. Since the lifting force value is negative at this point, lid 45 will be held in this position, staying open "on its own" with a hold open force of approximately half a pound.

Typical transport mechanisms weigh from about 18 to 20 pounds. Thus, when lid 45 is lifted along with the transport mechanism, as shown in FIG. 5, this makes for a total cover weight of approximately 25 to 30 pounds. It has been found that conventional gas springs 69 and 70, charged to the proper pressure and acting through appropriate lever arm lengths 71 on the transport mechanism, when used in cooperation with the counterbalancing on the lid 45 will provide a suitable counterbalancing force on the cover. Gas springs are well known and are extensively used in counterbalancing positions. Many of the newer model hatchback automobiles use gas spring counterbalancers on their liftable windows.

The effect of gas springs 69 and 70, used in conjunction with torsion springs 59 and 60, on the lifting force required to raise or lower platen cover 36 is shown in FIG. 6. With the preferred 35 lb./in.$^2$ gas springs, it may be seen from curve 75 that a lifting force of up to 1.75 lbs. must be applied to raise cover 36 until opened to an angle of approximately 55°. From 55° to 60°, the lifting force will be negative, indicating that cover 36 will require restraint to prevent further lifting action. At 66°, mechanical stops may be provided, or gas springs 69 and 70 arranged so as to be fully extended, such that cover 36 will be prevented from further opening. Since the lifting force value at 66° is negative, cover 36 will remain unaided in its fully open position.

The closing force required to lower cover 36 when both gas springs 69 and 70 and torsion springs 59 and 60 are used is illustrated by curve 76 in FIG. 6. It will be understood that, for curve 76, a positive force indicates a downward, closing force that must be applied to lower cover 36. It can be seen from curve 76 that a positive closing force must be applied during the entire closing of cover 36 until it is seated. Once closed, however, a positive lifting force must be applied to reraise the cover. Cover 36 may be retained in a closed position by some appropriate latching means, such as the conventional striker magnets illustrated at 78 in FIGS. 2 and 8.

While the form of apparatus herein described constitutes a preferred embodiment of the invention, it is to be understood that the invention is not limited to this precise form of apparatus, and that changes may be made therein without departing from the scope of the invention.

What is claimed is:

1. In a copying machine comprising a frame, a platen mounted on said frame for exposing bulky documents, a scan station mounted on said frame separate from said platen for exposing sheet-type documents, sheet transport means for transporting said sheet-type documents to said scan station, a platen cover for covering said platen, means pivotally mounting said platen cover on said frame, and counter-balancing means acting between said frame and said platen cover for aiding in the lifting of said platen cover; the improvement wherein said means mounting said platen cover pivots along an axis parallel to the direction of movement of sheet-type documents through said transport means, said transport means includes a plurality of transport belts and pressure means for holding said sheet-type documents against said belts during their movement through said transport means, said transport means is mounted within said platen cover and is covered by a lid which is detachably latched within said platen cover and which is pivotally attached to said frame for pivotal movement about the same axis as said cover for opening while said platen cover is closed and, linkage means mounted between said platen and said cover for supporting said pressure means so that when said lid is pivoted relative to said cover said pressure means is removed from said transport belts for removing jammed documents therefrom.

2. The improvement of claim 1 wherein said lid is counterbalanced against said frame in a direction aiding the counterbalancing of said platen cover.

3. The improvement of claim 2 wherein said platen cover is counterbalanced against said frame by a gas spring and said lid is counterbalanced against said frame by a torsion spring.

4. The improvement of claim 1 wherein said platen cover includes a pressure pad which is pressed against said platen when said platen cover is closed.

5. The improvement of any of claims 1 through 4 wherein said transport means includes a registration edge extending in the direction of movement of said documents through said platen cover, said transport belts are angularly directed for directing said documents against said registration edge while concomitantly transporting said documents through said platen cover; and said pressure means including a ball cage attached to said lid, and a plurality of balls mounted within said ball cage for urging said documents toward said transport belts when said lid is latched within said platen cover.

6. The improvement of claim 1 including:
    means cooperating with said lid for counter-balancing said lid and providing a first stay open force; and
    means cooperating with said cover and said means for counter-balancing said lid for counter-balancing said cover and providing a hold down force and a second stay open force.

7. In a copying machine including a frame, a platen mounted on said frame for exposing bulky documents, a scan station mounted on said frame separate from said platen for exposing sheet-type documents, sheet transport means for transporting said sheet-type document to said scan station, a platen cover pivotally mounted to said frame over said platen, and counter-balancing means acting between said frame and said platen cover for aiding in the lifting of said platen cover, the improvement wherein:
    said sheet transport means is mounted within said platen cover above and remote from said platen for transporting said sheet-type documents above and out of engagement with said platen toward said scan station and screening means for screening said transport means from said platen for providing a clean smooth background around documents to be exposed on said platen.

8. The improvement of claim 7, wherein:
    said screening means comprises a pressure pad mounted to said platen cover between said transport means and said platen.

9. The improvement of claim 8, including:
    a lid forming a portion of said platen cover above said transport means for providing access thereto and which is detachably latched within said platen cover and which is further pivotally attached to said frame for opening while the rest of said platen cover is closed.

* * * * *